United States Patent
Schoen et al.

(10) Patent No.: US 11,057,536 B2
(45) Date of Patent: Jul. 6, 2021

(54) SYSTEM FOR ANALYZING A DOCUMENT AND CORRESPONDING METHOD

(71) Applicant: Fraunhofer-Gesellschaft zur Foerderung der angewandten Forschung e.V., Munich (DE)

(72) Inventors: Tobias Schoen, Nuremberg (DE); Wolfgang Holub, Fuerth (DE); Daniel Stromer, Hoechstadt (DE); Andreas Maier, Erlangen (DE); Gisela Anton, Erlangen (DE); Michel Thilo, Nuremberg (DE); Martin Vossiek, Fuerth (DE); Jan Schuer, Langensendelbach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/793,858

(22) Filed: Feb. 18, 2020

(65) Prior Publication Data
US 2020/0186666 A1    Jun. 11, 2020

Related U.S. Application Data

(63) Continuation of application No. PCT/EP2018/072815, filed on Aug. 23, 2018.

(30) Foreign Application Priority Data

Aug. 23, 2017  (EP) .................................... 17187598

(51) Int. Cl.
*H04N 1/203*  (2006.01)
*G01N 21/3586*  (2014.01)
(Continued)

(52) U.S. Cl.
CPC ....... *H04N 1/2038* (2013.01); *G01N 21/3586* (2013.01); *G01N 23/041* (2018.02);
(Continued)

(58) Field of Classification Search
CPC ................ G06F 16/835; G06F 40/106; G06K 2009/363; H04N 1/387; H04N 1/3873;
(Continued)

(56) References Cited

U.S. PATENT DOCUMENTS

| | | | | | |
|---|---|---|---|---|---|
| 5,923,434 | A | * | 7/1999 | Lex ......................... | G01N 21/57 356/445 |
| 6,691,563 | B1 | * | 2/2004 | Trabelsi ................. | G01N 22/04 324/640 |

(Continued)

FOREIGN PATENT DOCUMENTS

EP    3048441 A1    7/2016

OTHER PUBLICATIONS

Amrehn, Mario, et al., "Portability of TV-Regularized Reconstruction Parameters to Varying Data Sets.", Bildverarbeitung für die Medizin 2015, Springer Berlin Heidelberg, 2015. 131-136, pp. 131-136.
(Continued)

*Primary Examiner* — Negussie Worku
(74) *Attorney, Agent, or Firm* — Perkins Coie LLP; Michael A. Glenn

(57) ABSTRACT

The invention refers to a system for analyzing a document. Each of two measurement arrangements includes two components being a radiation source and a radiation detector, respectively. The two measurement arrangements provide measurement data and differ from each other with regard to a measurement principle, a kind of radiation source, a kind of radiation detector, a kind of relative movement between the document and a component, a kind of relative arrange-
(Continued)

ment of the two components to each other, a kind of emitted radiation, a kind of received radiation or a kind of processing information about radiation emitted by the respective radiation source and/or about radiation received by the respective radiation detector. An evaluator provides data based on the measurement data. The invention also refers to a corresponding method.

20 Claims, 9 Drawing Sheets

(51) Int. Cl.
    *G01N 23/083* (2018.01)
    *G01N 23/041* (2018.01)
    *G01N 23/046* (2018.01)
    *G01T 1/17* (2006.01)

(52) U.S. Cl.
    CPC ......... *G01N 23/046* (2013.01); *G01N 23/083* (2013.01); *G01T 1/17* (2013.01); *H04N 2201/0434* (2013.01)

(58) Field of Classification Search
    CPC ......... H04N 1/2038; H04N 2201/0434; H04N 1/04; H04N 1/0082; G01N 23/041; G01N 21/3586; G01N 23/046; G01N 23/083; G01N 2201/10; G01T 1/17
    USPC .......................................................... 358/474
    See application file for complete search history.

(56) References Cited

U.S. PATENT DOCUMENTS

| | | | | |
|---|---|---|---|---|
| 7,391,518 | B1* | 6/2008 | Schwarz | G01B 11/30 356/445 |
| 8,928,886 | B2* | 1/2015 | Lex | G01N 21/55 356/445 |
| 2003/0198398 | A1* | 10/2003 | Guan | G06T 5/003 382/255 |
| 2006/0067559 | A1 | 3/2006 | Donders | |
| 2006/0100989 | A1* | 5/2006 | Chinchwadkar | G06F 16/835 |
| 2010/0033772 | A1 | 2/2010 | Borison et al. | |
| 2010/0177864 | A1* | 7/2010 | Donath | A61B 6/4291 378/16 |
| 2012/0294528 | A1* | 11/2012 | Li | H04N 1/3873 382/173 |
| 2015/0320365 | A1* | 11/2015 | Schulze | G06F 19/321 600/408 |
| 2017/0206995 | A1 | 7/2017 | Baumann et al. | |
| 2019/0159748 | A1* | 5/2019 | Amr | A61B 6/032 |
| 2019/0162680 | A1* | 5/2019 | Amr | G06T 7/0012 |

OTHER PUBLICATIONS

Arridge, Simon R, "Optical tomography in medical imaging.", Inverse problems 15.2 (1999): R41, Nov. 4, 1998, pp. R41-R93.
Diaz, Ana, et al., "X-ray phase imaging with a grating interferometer.", Optics express 13.16 (2005): 6296-6304, pp. 6296-6304.
Feldkamp, Lee A, et al., "Practical cone-beam algorithm", Josa A, vol. 1, No. 6, pp. 612-619, 1984, Jun. 1984, pp. 612-619.
Glaser, Leif, et al., "The Basics of Fast-scanning XRF Element Mapping for Iron-gall Ink Palimpsests", Manuscript cultures, vol. 7, No. PUBDB-2015-06320, pp. 104-112, pp. 104-112.
Harder, Whitney, "The Scroll from En-Gedi: A High tech Recovery Mission", http://uknow.uky.edu/content/scroll-en-gedi-high-tech-recovery-mission, 4 pp.
Hoelen, C. G. A, "Three-dimensional photoacoustic imaging of blood vessels in tissue.", Optics letters 23.8 (1998): 648-650, Apr. 15, 1998, pp. 648-650.
Mittleman, Daniel M, et al., "T-Ray Imaging", IEEE Journal of Selected Topics in Quantum Electronics, vol. 2, Nr. 3, Sep. 1996, pp. 679-692, XP000689828, Sep. 1996, pp. 679-692.
Mocella, Vito, et al., "Revealing letters in rolled herculaneum papyri by x-ray phase-contrast imaging", Nature communications, vol. 6, 2015, 6 pp.
Pernerstorfer, Matthias J, "Von der Digitalisierungsidee zur Digitalen Bibliothek. Wege für Museen, Bibliotheken und Archive in die Europeana.", AKMB-news: Informationen zu Kunst, Museum und Bibliothek 18.2, Feb. 2012, pp. 16-18.
Redo-Sanchez, Albert, et al., "Terahertz time-gated spectral imaging for content extraction through layered structures.", Nature Communications 7 (2016): 12665, 7 pp.
Seales, William Brent, et al., "From damage to discovery via virtual unwrapping: Reading the scroll from En-Gedi", Sci. Adv. 2016;2: e1601247, Sep. 21, 2016, 10 pp.
Siegel, Peter H, "Terahertz technology", IEEE Transactions on microwave theory and techniques 50.3 (2002): 910-928, Mar. 2002, pp. 910-928.
Stromer, Daniel, et al., "3-D Reconstruction of Iron Gall Ink Writings", 7th Conference on Industrial Computed Tomography, Leuven, Belgium (iCT 2017), 7 pp.
The Economist, "Burnt offering", http://www.economist.com/node/21707518/print, Sep. 24, 2106, 2 pp.
Tonouchi, Masayoshi, "Cutting-edge terahertz technology.", Nature photonics 1.2 (2007): 97-105, pp. 97-105.
Xu, Minghua, et al., "Photoacoustic imaging in biomedicine.", Review of scientific instruments 77.4 (2006): 041101, pp. 041101-1-041101-22.
Zeng, Gengsheng Lawrence, "Medical Image Reconstruction", Springer, 2010, 2010, 136 pp. Uploaded in 2 parts.
Lee, Alana S, et al., "Raman analysis of iron gall inks on parchment", Vibrational Spectroscopy 41.2 (2006): 170-175, 2006, pp. 170-175.
Ternov, M, "Synchrotron radiation", 1995.

* cited by examiner

SYSTEM FOR ANALYZING A DOCUMENT AND CORRESPONDING METHOD

CROSS-REFERENCE TO RELATED APPLICATIONS

This application is a continuation of copending International Application No. PCT/EP2018/072815, filed Aug. 23, 2018, which is incorporated herein by reference in its entirety, and additionally claims priority from European Application No. EP 17187598.2, filed Aug. 23, 2017, which is also incorporated herein by reference in its entirety.

The invention refers to a system for analyzing at least one document. The invention also refers to a method for analyzing at least one document. A document is, for example, a book or a papyrus.

BACKGROUND OF THE INVENTION

Analyzing a document refers, for example, to scanning its content for digitization. Possible problems of this task are the condition of the document e.g. due to its age or the duration of the scanning process.

Especially for old and/or fragile books it is desirable to make pages and their writings visible for the human eye without opening the book or performing a page-turning which is impossible for certain historical writings or historical documents that are heavily damaged. Due to this damage they are not accessible anymore. Any attempt to open the documents for the purpose of reading would result in their destruction.

State-of-the-art book digitization systems mainly consist of two parts. The first part is the book holder, which automatically turns the pages by an air flow with up to 2500 pages per hour. The second part is the capturing system, consisting of a camera system and specific illumination techniques for high quality outputs [1]. Although these scanners are able to obtain the information of a page by using an opening angle of only 60° to 80°, the process of turning the pages is still essential for gathering images.

Another approach for the digitization process is using X-Ray imaging. Mocella et al. [2] used X-Ray phase contrast imaging to recover writings on papyri rolls from Herculaneum. Deckers and Glaser [3] used the same technique to reveal even erased or overwritten writings on palimpsests. The data of both methods was acquired with a Synchrotron radiation system [4] having the downside that it is highly complex and expensive. It is not based on off-the-shelf hardware and not mobile which makes in unfeasible for everyday applications. Lattice-based X-Ray phase contrast, especially imaging with dark-field contrast allows to calculate 2-D image/3-D volume structure information down to 0.5 µm in large objects (up to 15 cm). The technique is based on the X-Ray Talbot Interferometer [5].

Modern CT C-arm X-Ray Scanners with Cone Beam Geometry [6] comprise a detector and a source that rotate around a rotation axis z. Currently used X-Ray flat detectors have pixel shifts of around 5-20 µm. Terahertz time-domain spectroscopy (THz-TDS) is currently used for imaging and nondestructive testing in the frequency range of (0.1-10) THz [8][9]. Its radiation penetrates many dielectric materials such as paper or clothing but is not ionizing due to its small photon energy. A source emits a THz pulse through the medium and the reflected waves are measured. However, the drawback of this method is that the penetration depth is limited by the thickness of the pages and the air gap between them. Redo-Sanchez et al. showed in their work [10], that the reconstruction of up to nine pages is possible. However, their method also shows another downside of this method. The letters of some page's overlap for a certain thickness due to imprecise depth position information, such that if, for example, two equal letters that overlap each other could not be recognized properly, or if the shape of the letters are nearly identical, e.g. 'E' and 'F', problems occur.

Photoacoustic imaging (optoacoustic imaging) is a imaging modality based on the photoacoustic effect where non-ionizing laser pulses are delivered into the object. When using radio frequency pulses, the technology is called thermoacoustic imaging. The object absorbs parts of the energy, leading to transient thermoelastic expansion. This leads to wide-band ultrasonic emission which is detected by certain transducers and images can be calculated. This method is commonly used for biomedical applications such as tissue imaging [11][12].

Fluorescence imaging is highly sensitive molecular imaging technology. The technology enables to image the distribution of fluorophores in tissue [13].

SUMMARY

According to an embodiment, a system for analyzing at least one document, may have at least two measurement arrangements and an evaluator, wherein each of the at least two measurement arrangements includes at least two components, where one component of the at least two components is a radiation source and another component of the at least two components is a radiation detector, wherein each of the at least two measurement arrangements provides measurement data based on radiation emitted by the respective radiation source and radiation received by the respective radiation detector, wherein the at least two measurement arrangements differ from each other with regard to at least one of a measurement principle, a kind of radiation source, a kind of radiation detector, a kind of relative movement between the at least one document and at least one component, a kind of relative arrangement of the at least two components to each other, a kind of emitted radiation, a kind of received radiation, a kind of processing information about radiation emitted by the respective radiation source and/or about radiation received by the respective radiation detector, and wherein the evaluator provides data concerning the at least one document based on the measurement data provided by the at least two measurement arrangements.

According to another embodiment, a method for analyzing at least one document may have the steps of: performing at least two measurements using at least two measurement arrangements, wherein each of the at least two measurement arrangements includes at least two components, where one component of the at least two components is a radiation source and another component of the at least two components is a radiation detector, wherein the at least two measurement arrangements differ from each other with regard to at least one of a realized measurement principle, a kind of radiation source, a kind of radiation detector, a kind of relative movement between the at least one document and at least one component, a kind of relative arrangement of the at least two components, a kind of emitted radiation, a kind of received radiation, a kind of processing information about radiation emitted by the respective radiation source and/or about radiation received by the respective radiation detector, providing measurement data based on radiation emitted by the radiation sources and radiation received by the respective radiation detectors, and providing data concerning the at least one document based on the measurement data.

The system for analyzing at least one document comprises at least two measurement arrangements and an evaluator. Each of the two measurement arrangement comprises at least two components: one component is a radiation source and another component is a radiation detector. Each of the at least two measurement arrangements provides measurement data based on radiation emitted by the respective radiation source and radiation received by the respective radiation detector.

The at least two measurement arrangements differ from each other with regard to at least one of:
- a measurement principle,
- a kind of radiation source,
- a kind of radiation detector,
- a kind of relative movement between the at least one document and at least one component,
- a kind of relative arrangement of the at least two components to each other,
- a kind of emitted radiation,
- a kind of received radiation,
- a kind of processing information about radiation emitted by the respective radiation source and/or about radiation received by the respective radiation detector.

The evaluator provides data concerning the at least one document based on the measurement data provided by the at least two measurement arrangements.

The system comprises at least two measurement arrangements being e.g. imaging systems that acquire images or volumes of the document that should be inspected. In an embodiment, each measurement arrangement calculates self-sufficient or uses data output by the at least one other measurement arrangement. According to an embodiment, the at least two measurement arrangements realize the same measurement principle but perform different movements relative to the document and/or evaluate different parameters for providing the measurement data. Hence, the at least two measurement arrangements comprise in an embodiment the same components. In an embodiment, X-Ray CT is used with different trajectories or THz-time-domain spectroscopy from differing positions. Finally, registration/calibration algorithms are used to merge the measurement data of the measurement arrangements in order to obtain a final result. The resolution and the acquisition size is limited by the used measurement arrangements.

One advantage is the possibility to handle large datasets with high throughput.

In an embodiment, the system comprises three measurement arrangements that differ from each other by at least one of the above mentioned characteristics.

According to an embodiment, the radiation emitted by at least one radiation source and received by at least one radiation detector of the at least two measurement arrangements are X-rays.

In an embodiment, at least one measurement arrangement of the at least two measurement arrangements provides the measurement data based on Computed Tomography (CT). By applying CT, the different absorption of paper and ink is used.

According to an embodiment, at least one measurement arrangement of the at least two measurement arrangements provides the measurement data based on Terahertz time-domain spectroscopy (THz-TDS). Within Terahertz time-domain spectroscopy the effect of different reflection coefficients e.g. of paper and ink is used. The application of x-rays concentrates on inks with an absorption differing from that of paper. Hence, this refers especially to inks containing a metal. In contrast to this, measurements using Terahertz spectroscopy even allows to examine inks based e.g. on berry juice (e.g. buckthorn).

In an embodiment, at least one measurement arrangement of the at least two measurement arrangements provides the measurement data based on phase contrast images. In phase contrast images, the pressure applied to a paper while writing can be identified.

Using two different modalities, e.g. by combining CT and THz-TDS, an effect of aging can be compensated.

According to an embodiment, at least one measurement arrangement of the at least two measurement arrangements provides the measurement data based on dark-field imaging.

In an embodiment, at least one measurement arrangement of the at least two measurement arrangements provides the measurement data based on absorption imaging.

According to an embodiment, at least one measurement arrangement of the at least two measurement arrangements provides the measurement data based on a Talbot-Lau method.

In an embodiment, at least one measurement arrangement of the at least two measurement arrangements provides the measurement data based on a relative rotation of the at least one document and at least one component of the at least two components around each other with an axis of rotation being orthogonal to a plane of the at least one document. The plane of the document is in one embodiment the plane of the pages of a book.

According to an embodiment, the measurement arrangement is configured to rotate at least one component of the at least two components around the at least one document. Here, at least one component of a measurement arrangement is rotated around the document.

In an embodiment, the radiation source of at least one measurement arrangement of the at least two measurement arrangements emits radiation towards a second plane perpendicular to a first plane of the at least one document, where the at least one document has a larger extension within the first plane than in the second plane. In this embodiment, the radiation used for the measurement of one measurement arrangement is directed towards a side with a smaller extension than another side of the document with a greater extension. In an embodiment, the document is a book. The first plane refers to the plane in which the cover and the pages are located and the second plan refers to the sides perpendicular to the cover, e.g. to the back of the book.

According to an embodiment, the radiation source of one measurement arrangement of the at least two measurement arrangements emits radiation towards a plane of the at least one document. The document has a largest extension within the plane. In an embodiment, the document is a book and the radiation is directed towards the plane in which the pages are located.

In an embodiment, at least one measurement arrangement of the at least two measurement arrangements provides the measurement data based on a relative movement between the at least one document and at least one component of the at least two components along a movement axis within a plane parallel to a plane of the at least one document and wherein the document has a largest extension within the plane. In an embodiment, the largest extension is given by the plane of the pages of the document. Hence, the measurement arrangement performs a kind of the scan along the e.g. written surface of the pages.

According to an embodiment, the evaluator provides data concerning a text written within the at least one document. Here, a digitization is performed.

In an embodiment, the evaluator provides data concerning a structural variation and/or a density fluctuation and/or a thickness of at least one page of the at least one document.

According to an embodiment, the evaluator provides data concerning a thickness of a distance between two pages of the at least one document.

In an embodiment, the system further comprises a holder configured for holding at least two documents. The holder allows to analyze more than one document or e.g. at least two books.

The object is also achieved by a method for analyzing at least one document.

The method comprises at least the following steps:
performing at least two measurements using at least two measurement arrangements, wherein each of the at least two measurement arrangements comprises at least two components, where one component of the at least two components is a radiation source and another component of the at least two components is a radiation detector, wherein the at least two measurement arrangements differ from each other with regard to at least one of a realized measurement principle, a kind of radiation source, a kind of radiation detector, a kind of relative movement between the at least one document and at least one component, a kind of relative arrangement of the at least two components, a kind of emitted radiation, a kind of received radiation, a kind of processing information about radiation emitted by the respective radiation source and/or about radiation received by the respective radiation detector, providing measurement data based on radiation emitted by the radiation sources and radiation received by the respective radiation detectors, and providing data concerning the at least one document based on the measurement data.

The embodiments of the system can also be realized by the method, and vice versa.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
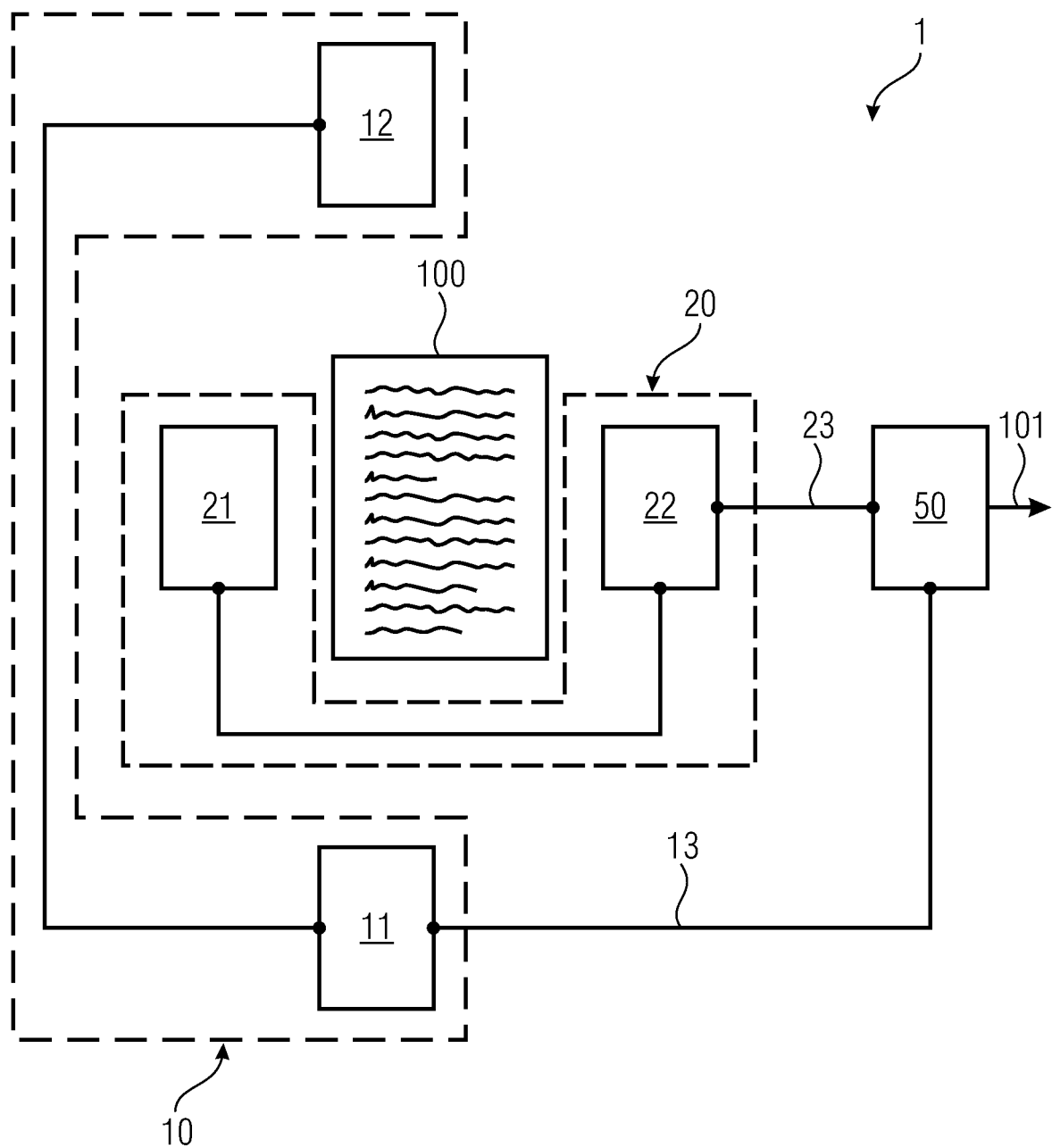
FIG. 1 shows an abstract embodiment of the system for analyzing documents.

FIG. 1 shows a system 1 for analyzing a document 100. In the shown embodiment, the document 100 is scanned in order to digitize its content. For this purpose, the system 1 comprises two measurement arrangements 10, 20 and an evaluator 50. The evaluator 50 receives measurement data 13, 23 and provides the desired analysis data 101 concerning the document 100.

Each of the two measurement arrangements 10, 20 comprises two components 11, 12, 21, 22. In the shown embodiment, the connecting lines between the two associated components 11, 12, 21, 22 are perpendicular to each other.

Each measurement arrangement 10, 20 has one component that serves as a radiation source 11, 21 and one component that is configured as a radiation detector 12, 22. The respective measurement data 13, 23 are based on the radiation emitted by the radiation sources 11, 21 and the radiation received by the radiation detectors 12, 22. The measurement data 13, 23 are in an embodiment raw data concerning the radiation. In a different embodiment, the information about the radiation is at least pre-processed.

The measurement arrangements 10, 20 differ from each other. The possible differences refer, for example, to:
the measurement principles that a realized by the measurement arrangements 10, 20,
the specific radiation sources that are compromised by the measurement arrangements 10, 20,
the kind of radiation detectors 12, 22 used by the measurement arrangements 10, 20,
a relative movement between the document 100 and at least one component 11, 12, 21, 22 of the measurement arrangements 10, 20,
the way how the components 11, 12, 21, 22 belonging to the same measurement arrangement 10, 20 are arranged relative to each other,
the emitted radiation,
the received radiation,
the kind of information relevant for the processing and obtaining of the measurement data concerning the emitted radiation and/or received radiation.

In some embodiments, the same components are used but in a different way or with a different relative location and/or movement with regard to the document.

In the shown embodiment, the measurement arrangements 10, 20 are differently arranged with respect to the document 100. Further, the radiation detector 12 of the first measurement arrangement 10 is connected with the radiation source 11 that provides the measurement data 13. Contrary to this, the radiation source 21 of the second measurement arrangement 20 is connected with the radiation detector 22 that is configured to provide based on the emitted and received radiation the measurement data 23.

Thus, the measurement arrangements 10, 20 allow to obtain different measurement data 13, 23 due to the measurements as such and/or due to different steps performed during the evaluation process for providing the respective measurement data.

The different measurement data 13, 23 increase the information about the document 100 which is used by the evaluator 50 for generating the analysis data 101.

The requirements for the measurement arrangements and the way of merging the measurement data are based in an embodiment on the following optimization.

The modalities refer to the different kinds of measurements realized by the measurement arrangements.

If $N_m$ modalities m are used to reconstruct a document, then the following optimization problem is generated:

$$\sum_{m=0}^{N_m} \lambda_m \cdot \|A_m x - p_m\|_2^2 + \sum_{r=0}^{N_r} \lambda_r \cdot R_r(x)$$

With the following variables:
The variable m describes a modality.
The variable $N_m$ describes the total number of modalities used for the reconstruction.
The variable $A_m$ describes as system of linear equations of a modality m.
The variable x describes an intensity value of voxel in a reconstruction volume.
The variable $p_m$ describes a projection of a modality m.
The variable $N_r$ describes the total number of regularizers r.
The variable r describes a regularizer.
The variable $R_r(x)$ describes a regularizing function of a regularizer r.
The variable $\lambda_m$, $\lambda_r$ describe LaGrange Multipliers.

The complete optimization problem is split into $N_m$ independent problems with $N_r$ additional regularization problems.

The individual minimization problems for the reconstructions ($\|A_m x - p_m\|_2^2$) are in one embodiment solved by using common iterative solution methods (e.g. gradient-descent approaches) and for each modality the best fitting regularizers are chosen. The generated modality projections $p_m$ have a certain resolution and image contrast, limited to the specific modality. However, the complete resolution of the reconstruction system is only limited by the resolution of the highest used modality.

As each modality has its own strength, a smart combination of the used modalities is used resulting in an enhanced reconstruction combining the strengths and eliminating the weakness of each modality.

In an embodiment, a scanning system consisting of three modalities is used:
1. X-Ray CT (X-Ray)
2. Phase-Contrast system (PC)
3. Terahertz Scanner (THz)

The following optimization problem results:

$$\lambda_{X\text{-}Ray} \cdot \|A_{X\text{-}ray} x - p_{X\text{-}Ray}\|_2^2 + \lambda_{PC} \cdot \|A_{PC} x - p_{PC}\|_2^2 + \lambda_{THz} \cdot \|A_{THz} x - p_{THz}\|_2^2 + \lambda_{TV} \cdot \|\psi x\|_1$$

In an embodiment, a Total Variation Regularization is chosen. This is based on the assumption that the measured signals are piecewise constant. $\psi$ is a sparsifying transformation (such as the gradient) applied on the reconstructions x [15].

The three acquired projections have different resolutions and the image intensities/contrasts derive from different physical phenomena:
The modalities and the corresponding physical phenomena and resolutions are:
For $p_{X\text{-}Ray}$, these are X-Ray absorption and detector resolution.
For $p_{PC}$, theses are micro dispersions and compression.
For $p_{THz}$, these are transmission and camera resolution.

The addition of the modalities results in a final enhanced reconstruction where the strengths of the specific modalities are combined.

Figure 2:
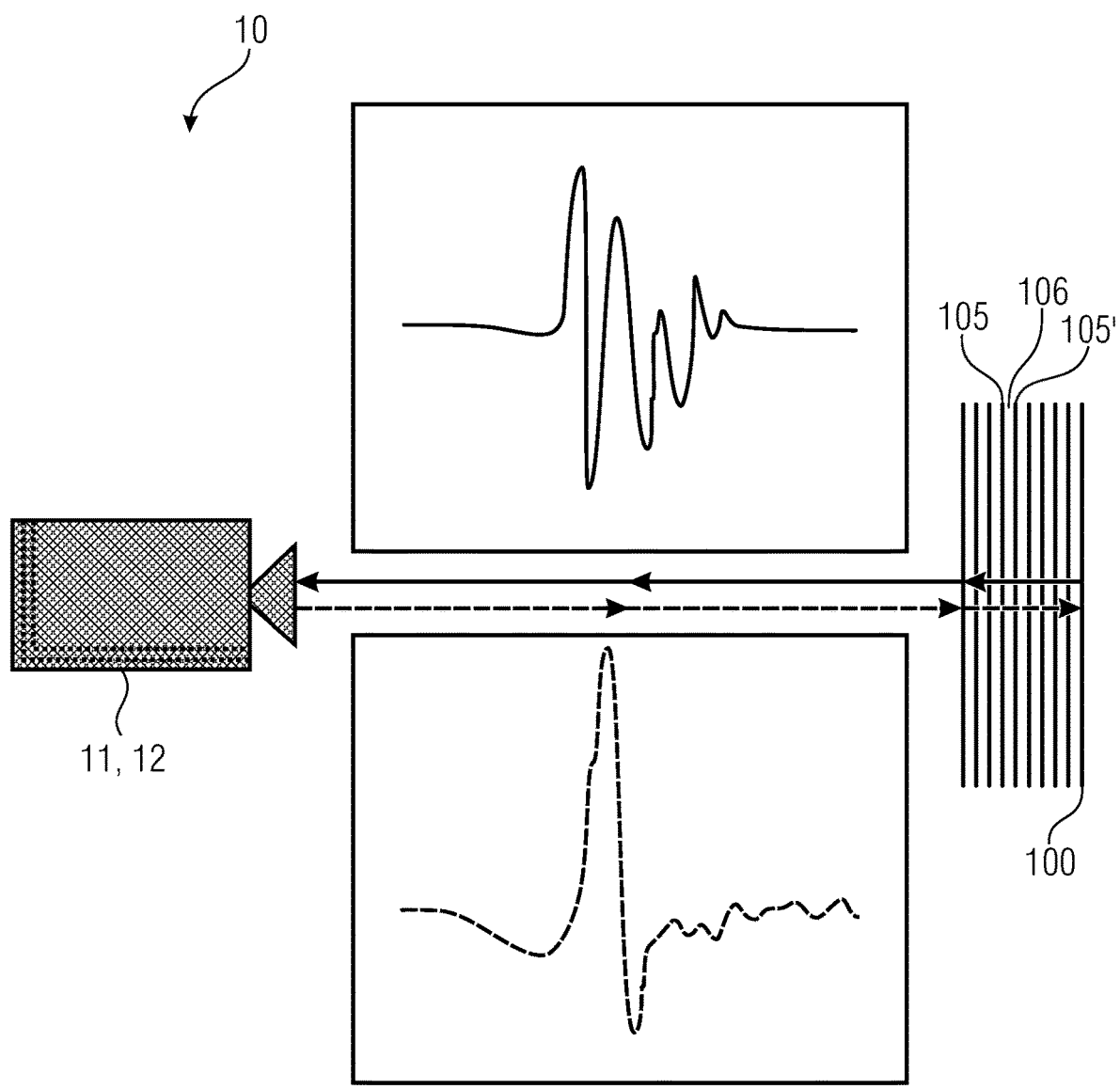
FIG. 2 illustrates a measurement with a THz-TDS system.

In FIG. 2 an embodiment is shown with a first measurement arrangement 10 in which the radiation source 11 and the radiation detector 12 are realized by one unit which is located perpendicular to the surface of the pages of the document 100. The emitted and received radiation is indicated by the arrows.

Shown is a THz-TDS system in which the THz source 11 emits a THz pulse which is given by the lower graph. This pulse is reflected by the document 100 which is here a book. The upper graph shows the reflected pulse. The evaluation of the emitted and the reflected pulse allows to scan the different pages 105, 105' and to evaluate the air gap 106 between the pages 105, 105'.

A difference in reflection factors between unwritten paper and paper described with ink can be detected by THz imaging. In the case of a paper stack, the reflected THz waves can be assigned to the respective sheet by the time domain windowing. The composition of ink and paper influences the reflection factor and thus the quality of the image.

Compared to computed tomography and optical imaging methods, THz imaging systems have a relatively low lateral resolution due to the comparatively large wavelength. However, due to the permeability of some materials, there are advantages over optical methods. Furthermore, electromagnetic waves in the frequency range used are non-ionizing and therefore harmless to health.

Figure 3:
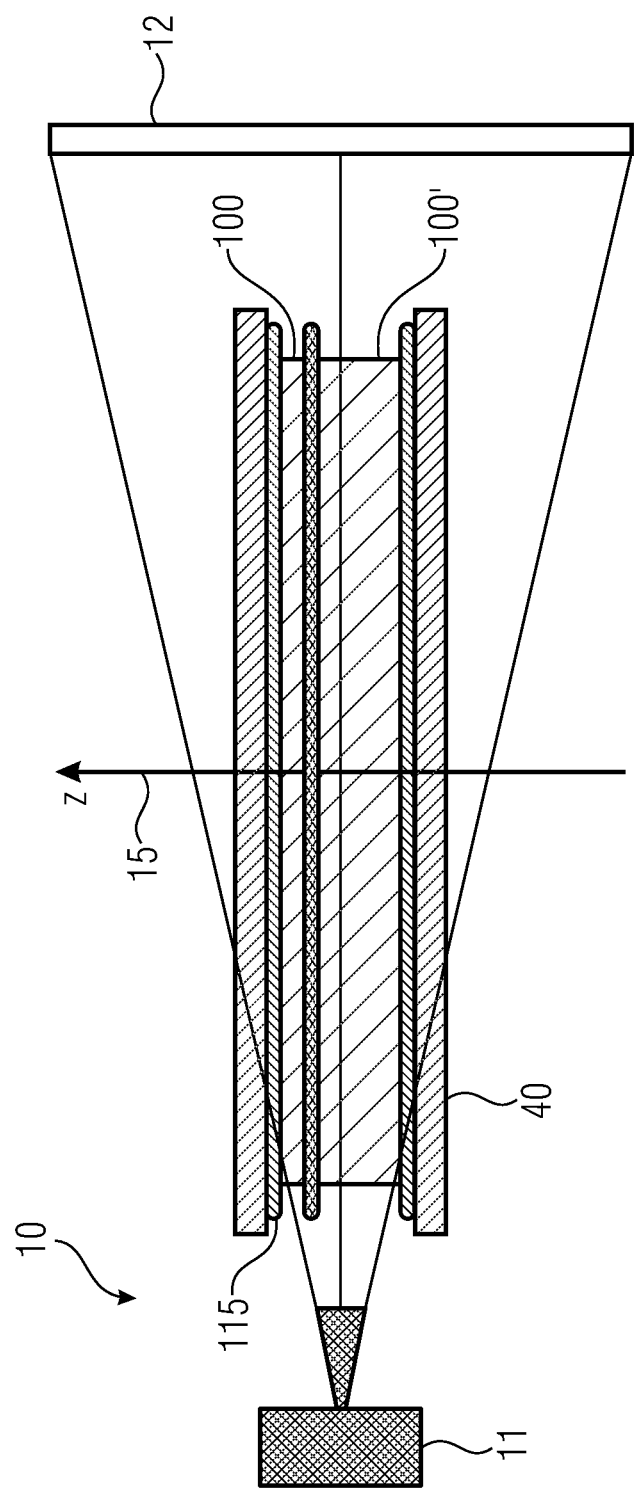
FIG. 3 demonstrates the measurement of two documents.

In the embodiment of FIG. 3 two documents 100, 100' are located within a holder 40. Of the system just one measurement arrangement 10 with a radiation source 11 and a radiation detector 12 is shown. The documents 100, 100' are arranged between the two components 11, 12 and, thus, within the path of the radiation. The radiation source 11 and the radiation detector 12 are rotated around the documents 100, 100' with an axis of rotation 15 that is perpendicular to a plane 115 in which the covers of the documents 100, 100' are located. With other words: the rotation happens around the smaller sides of the documents 100, 100'.

For the measurements, it is taken into account that paper mainly consists of cellulose. A widely used ink since the third century before Christ is iron gall ink. There are many historical recipes to produce iron gall ink [7], but all of them are based on the same ingredients: iron salt, tannic acid and gum arabic. One can remove the ink from the paper with simple methods, but particles that penetrated deeper layers of the paper will still be present. The fact that the ink has metallic particles leads to the presumption that X-Ray radiation should be able to image those particles such that the ink can be differentiated from the paper through higher absorption of the metal compared to cellulose. This allows to reconstruct even erased parts of a writing.

In the shown embodiment, the rotation plane for the full circle scan is placed in the plane of the pages such that the axis of rotation is orthogonal to the book's front cover and a scan is performed around the document 100. In the embodiment, for the 3-D reconstruction a FDK (after the authors Feldkamp, Davis, and Kress) method is used consisting of a cosine weighting, ramp filtering and back projection step [14]. The voxel size for the reconstruction was set to 68.14 µm×68.14 µm×68.14 µm.

In the shown embodiment, two imaging modalities which are based on X-rays are used: phase contrast images and dark-field images. In phase contrast images, the change of phase when X-rays enter and leave the material can be visualized. This change of phase causes a deflection of the X-ray wave front. While the phase signal is a measure of the large scale variation of the wave front, the dark-field images describe the small scale irregularity of the wave front which can be caused by objects which are smaller than the pixel size. Thus, the dark-field gives information on structural variations and density fluctuation. The exploitation of phase and dark-field signals for imaging has been enabled by the so called Talbot-Lau method, which has recently just became applicable for X-rays.

Hence, due to the different imaging modalities the same components are used for two different measurement arrangements.

Figure 4:
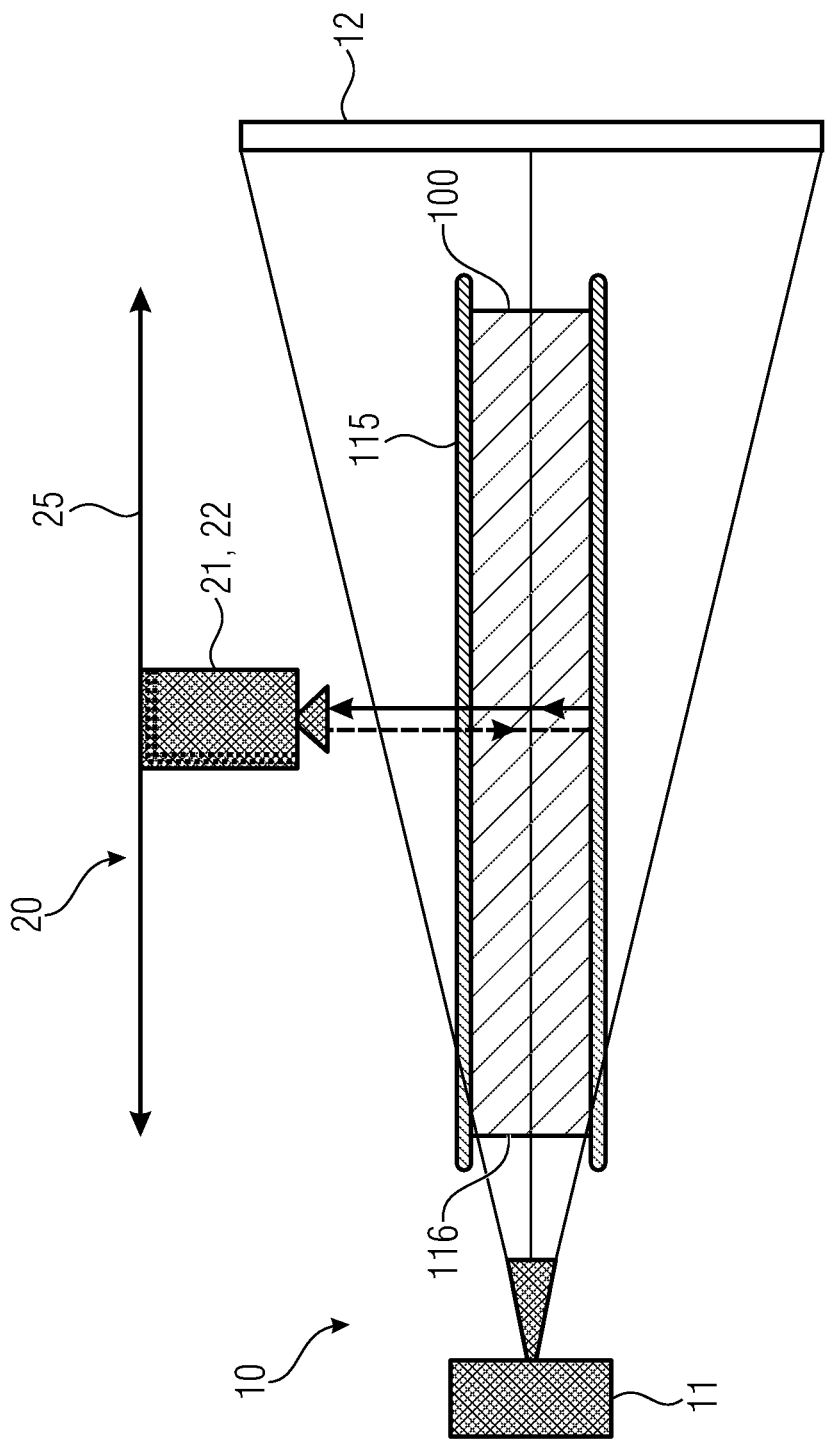
FIG. 4 illustrates a further embodiment of the system.

FIG. 4 shows the combination of an X-Ray measurement arrangement 10 and a THz-TDS measurement arrangement 20 leading to a to a multimodal scanning system.

A first measurement arrangement 10 allows an X-ray-measurement of the document 100. The radiation source 11 and the radiation detector 12 are arranged so that the book as an example of the document 100 lies between them and that the radiation is directed towards a second plane 116 which is perpendicular to the planes of the individual pages of the book. The radiation source 11 and the radiation detector 12 rotate around the document 100.

The second measurement arrangement 20 comprises one unit serving as radiation source 21 and radiation detector 22, where the radiation are THz pulses directed towards the first plane 115 and here also towards the written surface of the pages of the document 100. The THz pulses are emitted and the reflected signals are detected. For the measurement, the radiation source 21 and radiation detector 22 are moved along a movement axis 25 that is here parallel to the first plane 115. This measurement provides depth information.

The measurement data of both measurement arrangements 10, 20 are combined to obtain the desired analysis data. In an embodiment, the THz radiation settings are calculated using the information about the thickness of the pages and of the air gaps between them.

In an embodiment, X-ray detectors with a very small pixel size of 50 microns are used. Given that usual paper with a weight of 80 $g/mm^2$ has a thickness of about 100 microns, these detectors allow the reconstruction of two slices per page. The investigated methods are also applicable for documents in the form of scrolls.

In an embodiment with three measurement arrangements X-ray absorption, phase contrast, and dark-field imaging are performed.

Spatial resolution in X-ray imaging is influenced by two important factors: The size of the detector elements and the size of the focal spot that emits the X-ray radiation. Both have to be small in order to create images of high spatial resolution In an embodiment, the local deformation which stems from the pressure caused by a pen to the paper is visualized. In a different embodiment, the kind of used paper is analyzed. This is based on the fact that parchment is quite different from paper. Manufacturing paper causes the fibers to be distributed quite evenly across the sheet. Therefore, a very homogeneous impression even in the dark-field image is given. Most likely, parchment is similar, but the analysis refer to the manufacturing process of the parchment.

In this embodiments, the components of one measurement arrangement are used for two different measurements by evaluating two different variables of the respective measurements. Due to this, the same components belong to two different measurement arrangements which differ only with regard to the evaluating of the data.

Figure 5:
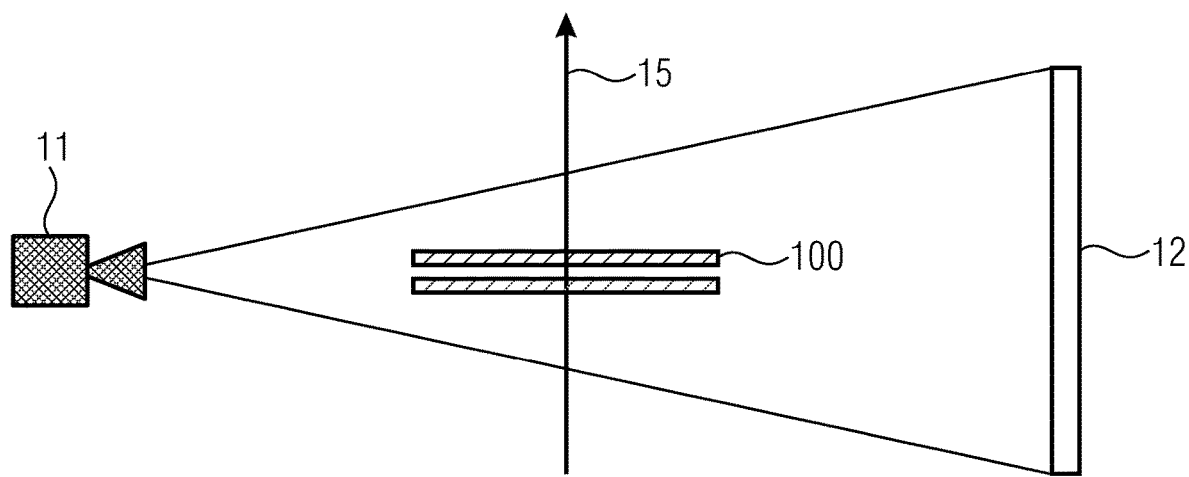
FIG. 5 illustrates a first arrangement concerning a rotation.

In the arrangement shown in FIG. 5, the document 100 is located between the radiation source 11 and the radiation detector 12 so that the axis of rotation 15 is orthogonal to the cover of the book being here the document 100. The reduced extension of the height reduces on one hand artifacts of the cone-beam when using x-rays. On the other hand, a more homogenous passing of the rays through the document 100 is possible.

Figure 6:
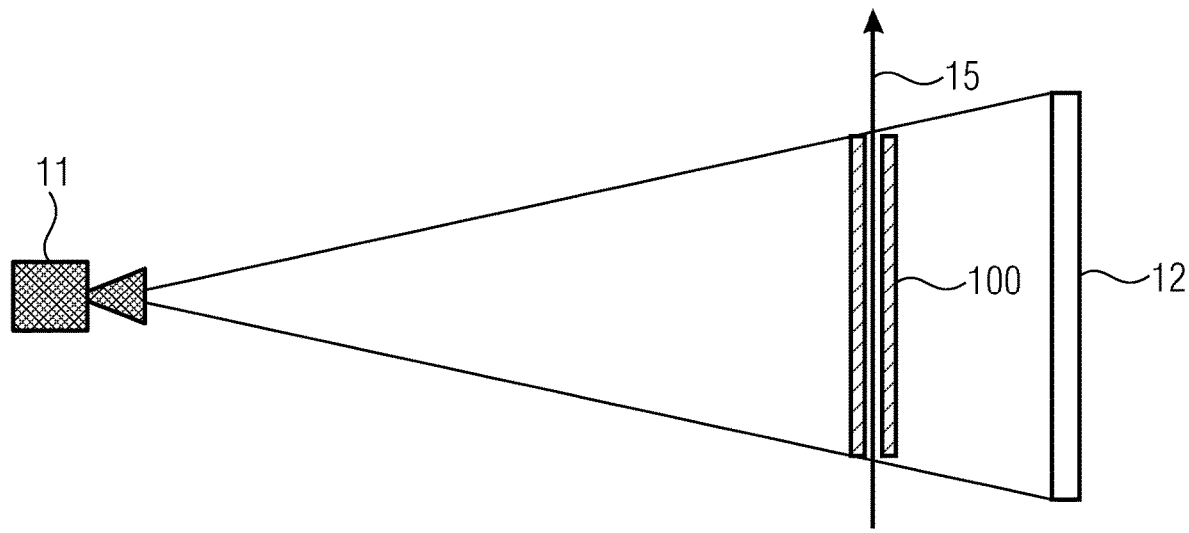
FIG. 6 illustrates a second arrangement concerning a rotation.

Within the arrangement of FIG. 6, the book 100 is located such that the axis of rotation 15 is parallel to the book cover. Further, the distance between radiation detector 12 and the document 100 is such set that the entire document 100 is displayed. Here, the measurement is performed using Terahertz.

Figure 7:
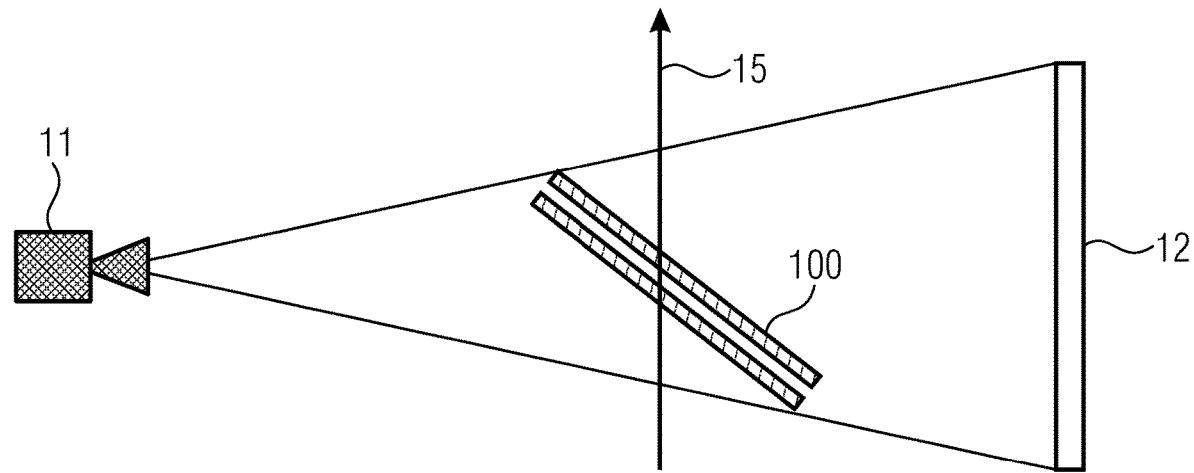
FIG. 7 illustrates a third arrangement concerning a rotation.

In the embodiment shown in FIG. 7, the document 100 is tilted by a certain angle in order to achieve an even length of transmission and to reduce artifacts. This measurement is done using X-rays-CT.

Figure 8:
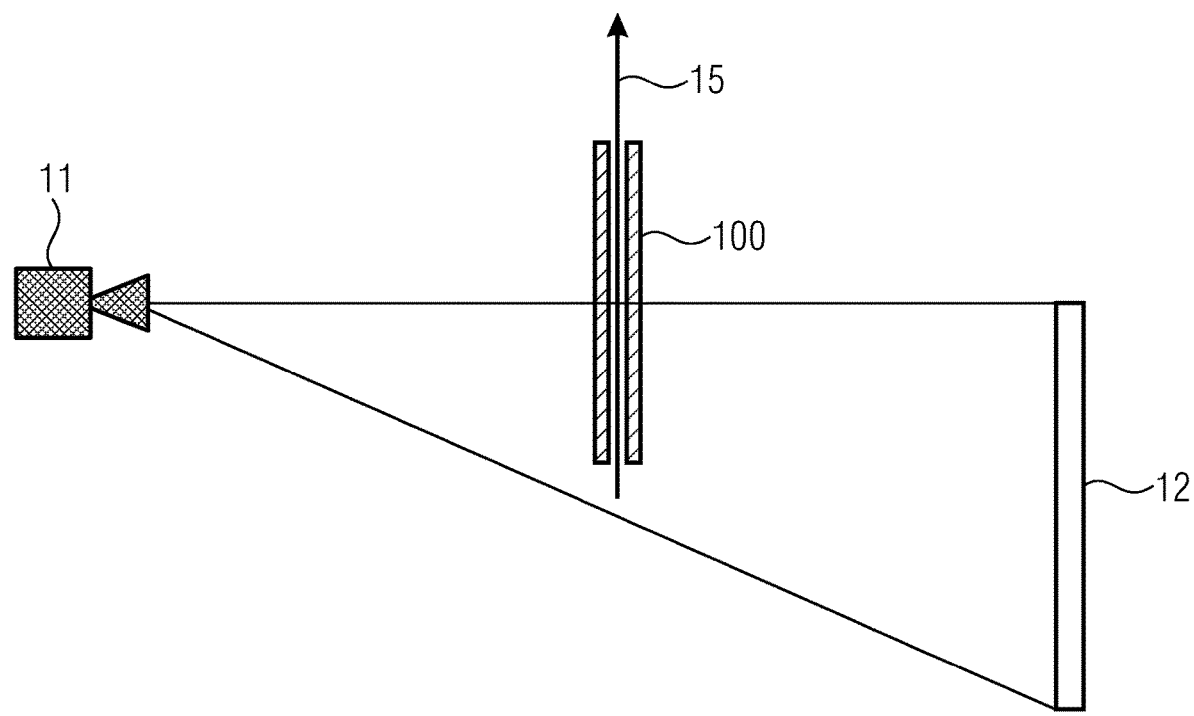
FIG. 8 illustrates a fourth arrangement concerning a rotation.

The embodiment of FIG. 8 refers to the case that the extension of the radiation detector 12 does not allow to measure the entire document 100 in one measurement. Hence, a large volume scan is performed in order to reconstruct the document 100. Here, the arrangement of FIG. 6 is used but it is possible with the other arrangements as well. In the embodiment, the document 100 is moved by a half of its length to the outside. With a 360° scan around the axis of rotation 15 a measurement of about a double of the volume is possible.

Figure 9:
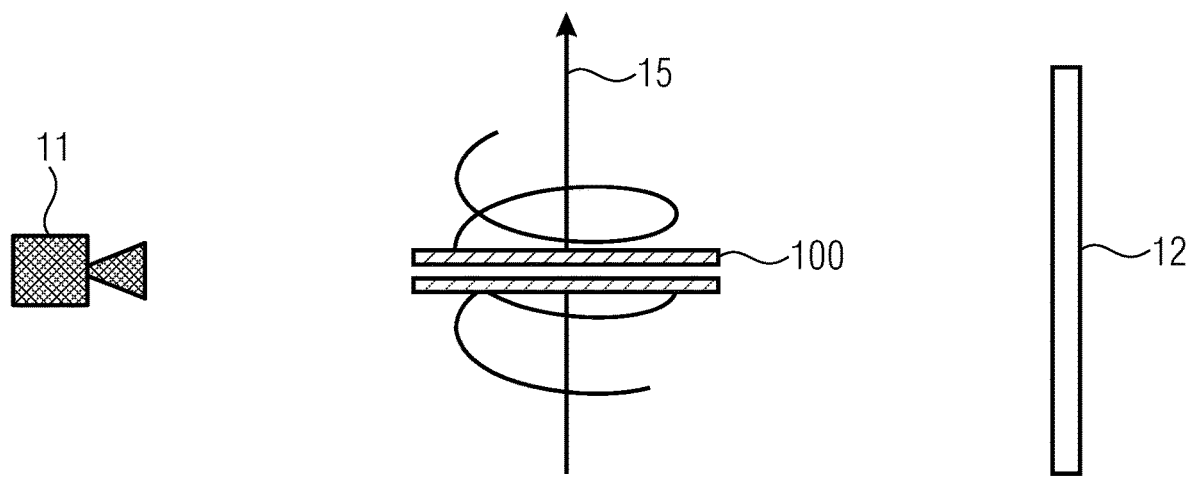
FIG. 9 illustrates a fifth arrangement concerning a rotation.

The embodiment of FIG. 9 shows a circular trajectory, performed using a helix. An advantage of a helix is when using x-rays the reduction of cone-beam artifacts.

The foregoing embodiments are e.g. performed using a 360° scan or a 180° scan (so called short scan). The latter embodiment is based on the fact that the second half of the scan allows only the measurement of redundant rays.

Figure 10:
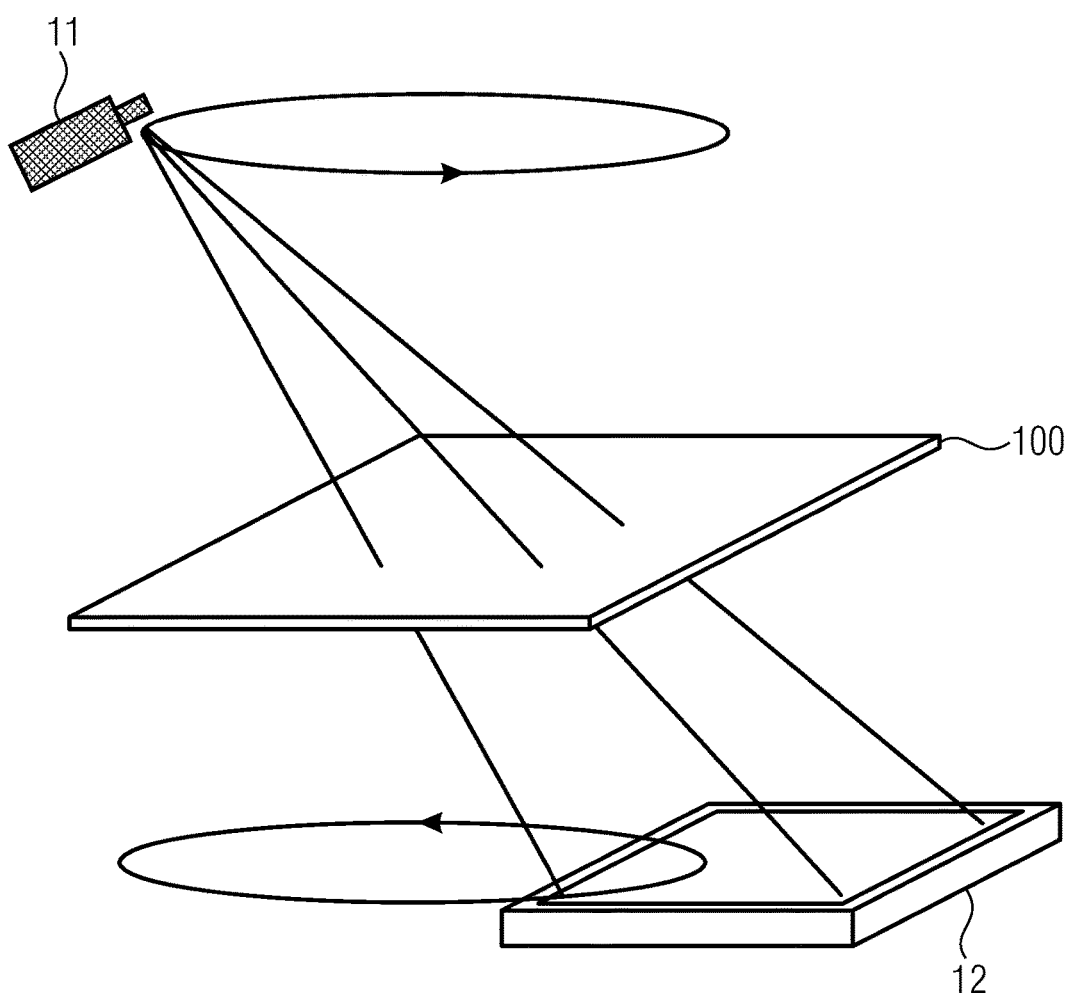
FIG. 10 shows a first embodiment of a laminographic measurement.
Figure 11:
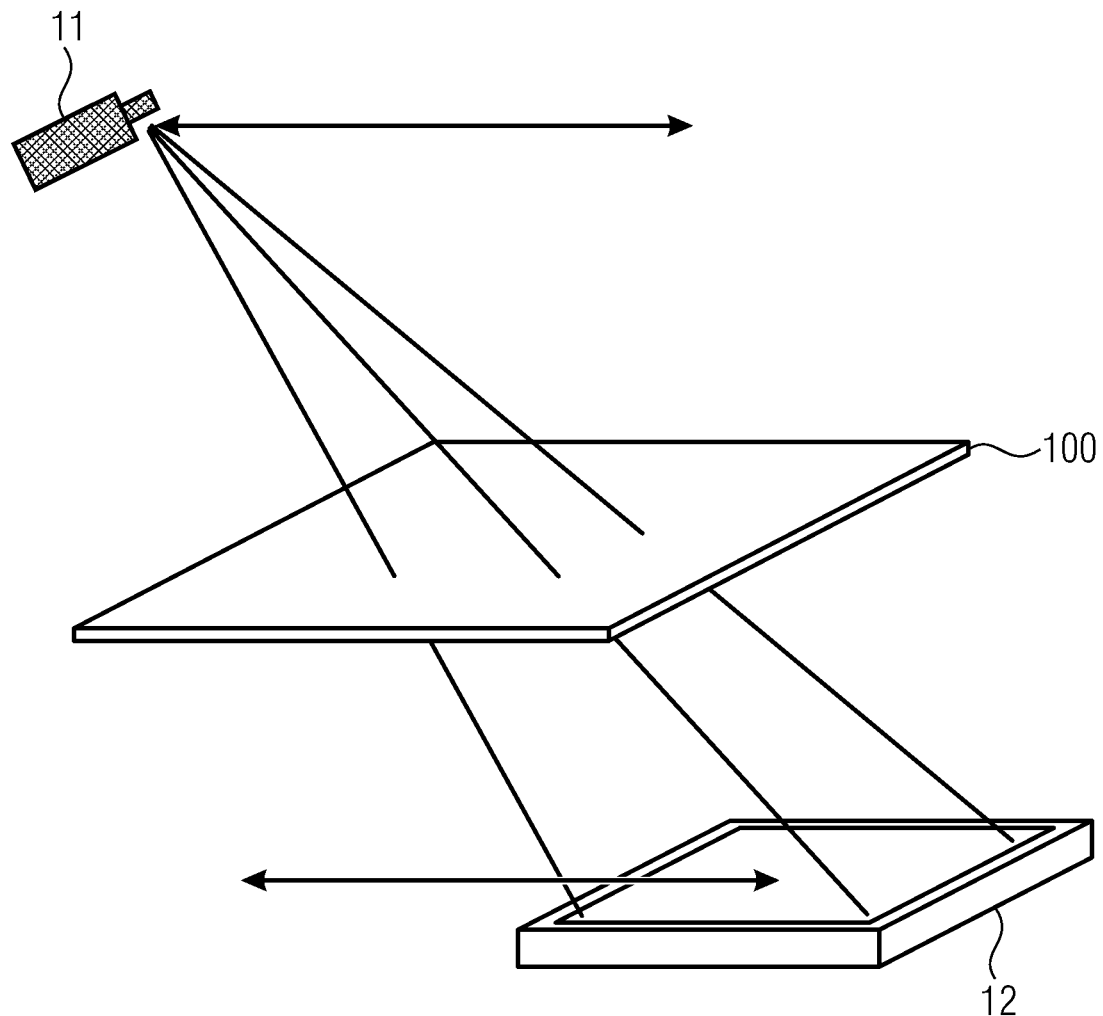
FIG. 11 shows a second embodiment of a laminographic measurement.

A principle of laminography is the measurement of the document 100 under different angles but emitting the radiation just from the same side. Usually, two of the three elements (radiation source 11, document 100, and radiation detector 12) perform coordinated movements. In the embodiment shown in FIG. 10, the radiation source 11 and the radiation detector 12 are moved in circles and in the embodiment of FIG. 11 they are moved along lines (indicated by the respective arrows). An advantage of this method is—especially for flat measurement objects—the large magnification and due to this the high resolution.

Figure 12:
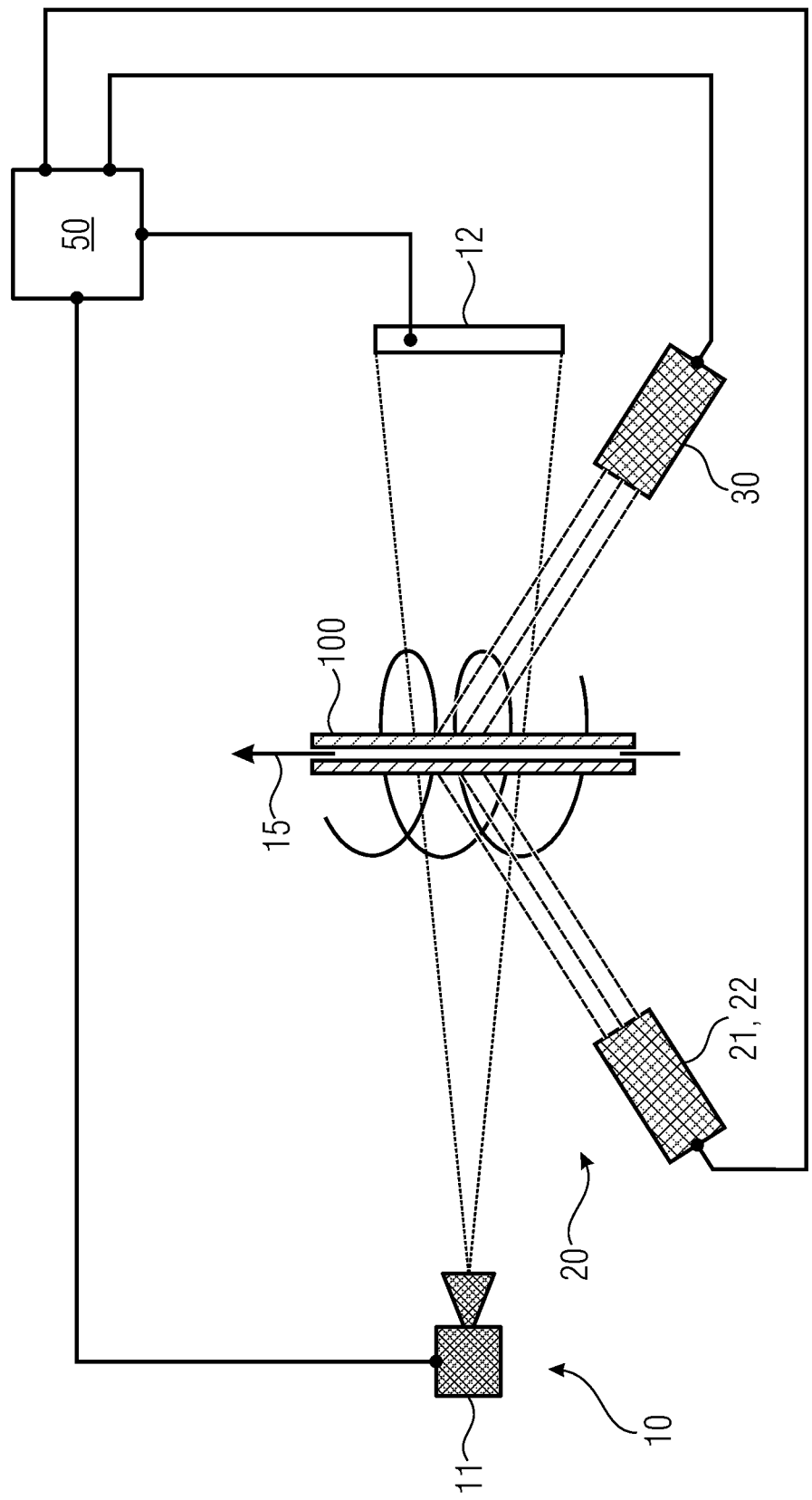
FIG. 12 shows an embodiment using three different measurement arrangements.

In the embodiment of FIG. 12, three different measurement arrangements 10, 20, 30 are used. The first measurement arrangement 10 uses x-rays. The second measurement arrangement 20 is a Terahertz Scanner. A the third measurement arrangement 30—in the shown embodiment—applies a different measurement method.

The first measurement arrangement 10 performs a rotation around the axis of rotation 15 parallel to the cover of the document 100, whereas the second measurement arrangement 20 is located under a 45° angle to the cover. The document 100 is depending on the embodiments moved and/or rotated. A simultaneous movement and rotation allows the helical scan indicated by the arrow. The third measurement arrangement 30—performing e.g. ultrasound or phase contrast x-ray measurement—is also located under a 45° angle to the cover of the document 100 and here also to the axis of rotation 15. The data of the three measurement arrangements 10, 20, 30 are combined by the evaluator 50 in order to obtain a three dimensional representation.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Generally, embodiments of the present invention can be implemented as a computer program product with a program code, the program code being operative for performing one of the methods when the computer program product runs on a computer. The program code may for example be stored on a machine readable carrier. Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Pernerstorfer, Matthias J. "Von der Digitalisierungsidee zur Digitalen Bibliothek. Wege für Museen, Bibliotheken und Archive in die Europeana." AKMB-news: Informationen zu Kunst, Museum und Bibliothek 18.2 (2013): 16-18.
[2] V. Mocella, E. Brun, C. Ferrero, and D. Delattre, "Revealing letters in rolled herculaneum papyri by x-ray phase-contrast imaging," Nature communications, vol. 6, 2015.
[3] L. Glaser and D. Deckers, "The Basics of Fast-scanning XRF Element Mapping for Iron-gall Ink Palimpsests," Manuscript cultures, vol. 7, no. PUBDB-2015-06320, pp. 104-112, 2014.
[4] Sokolov, Arseniĭ Aleksandrovich, and Igor' Mikhaĭlovich Ternov. "Synchrotron radiation." Akademia Nauk SSSR, Moskovskoie Obshchestvo lspytatelei prirody. Sektsia Fiziki. Sinkhrotron Radiation, Nauka Eds., Moscow, 1966, 228 pp. 1 (1966).
[5] Weitkamp, Timm, et al. "X-ray phase imaging with a grating interferometer." Optics express 13.16 (2005): 6296-6304.
[6] G. L. Zeng, Medical image reconstruction. Springer, 2010.
[7] A. Stijnman, "Historical iron-gall ink recipes: art technological source research for inkcor," Papier Restaurierung, vol. 5, no. 3, pp. 14-17, 2004.
[8] Tonouchi, Masayoshi. "Cutting-edge terahertz technology." Nature photonics 1.2 (2007): 97-105.
[9] Siegel, Peter H. "Terahertz technology." IEEE Transactions on microwave theory and techniques 50.3 (2002): 910-928.
[10] Redo-Sanchez, Albert, et al. "Terahertz time-gated spectral imaging for content extraction through layered structures." Nature Communications 7 (2016): 12665.
[11] Xu, Minghua, and Lihong V. Wang. "Photoacoustic imaging in biomedicine." Review of scientific instruments 77.4 (2006): 041101.
[12] Hoelen, C. G. A., et al. "Three-dimensional photoacoustic imaging of blood vessels in tissue." Optics letters 23.8 (1998): 648-650.
[13] Arridge, Simon R. "Optical tomography in medical imaging." Inverse problems 15.2 (1999): R41.
[14] L. Feldkamp, L. Davis, and J. Kress, "Practical cone-beam algorithm," JOSA A, vol. 1, no. 6, pp. 612-619, 1984.
[15] M. Amrehn et al., "Portability of TV-Regularized Reconstruction Parameters to Varying Data Sets." Bildverarbeitung für die Medizin 2015, Springer Berlin Heidelberg, 2015. 131-136.

The invention claimed is:

1. A system for analyzing at least one document, comprising at least two measurement arrangements and an evaluator,
wherein each of the at least two measurement arrangements comprises at least two components,
where one component of the at least two components is a radiation source and another component of the at least two components is a radiation detector,
wherein each of the at least two measurement arrangements provides measurement data based on radiation emitted by the respective radiation source and radiation received by the respective radiation detector,
wherein the at least two measurement arrangements differ from each other with regard to a measurement principle, and
wherein the evaluator provides data concerning the at least one document based on the measurement data provided by the at least two measurement arrangements.

2. The system of claim 1,
wherein the radiation emitted by at least one radiation source and received by at least one radiation detector of the at least two measurement arrangements are X-rays.

3. The system of claim 1,
wherein at least one measurement arrangement of the at least two measurement arrangements provides the measurement data based on Computed Tomography.

4. The system of claim 1,
wherein at least one measurement arrangement of the at least two measurement arrangements provides the measurement data based on Terahertz time-domain spectroscopy.

5. The system of claim 1,
wherein at least one measurement arrangement of the at least two measurement arrangements provides the measurement data based on phase contrast images.

6. The system of claim 1,
wherein at least one measurement arrangement of the at least two measurement arrangements provides the measurement data based on dark-field imaging.

7. The system of claim 1,
wherein at least one measurement arrangement of the at least two measurement arrangements provides the measurement data based on absorption imaging.

8. The system of claim 1,
wherein at least one measurement arrangement of the at least two measurement arrangements provides the measurement data based on a Talbot-Lau method.

9. The system of claim 1,
wherein at least one measurement arrangement of the at least two measurement arrangements provides the measurement data based on a relative rotation of the at least one document and at least one component of the at least two components around each other with an axis of rotation being orthogonal to a plane of the at least one document.

10. The system of claim 9, wherein the measurement arrangement is configured to rotate at least one component of the at least two components around the at least one document.

11. The system of claim 1, wherein the radiation source of at least one measurement arrangement of the at least two measurement arrangements emits radiation towards a second plane perpendicular to a first plane of the at least one document, where the at least one document has a larger extension within the first plane than in the second plane.

12. The system of claim 1, wherein the radiation source of one measurement arrangement of the at least two measurement arrangements emits radiation towards a plane of the at least one document, where the document has a largest extension within the plane.

13. The system of claim 1, wherein at least one measurement arrangement of the at least two measurement arrangements provides the measurement data based on a relative movement between the at least one document and at least one component of the at least two components along a movement axis within a plane parallel to a plane of the at least one document and wherein the document has a largest extension within the plane.

14. The system of claim 1, wherein the evaluator provides data concerning a text written within the at least one document.

15. The system of claim 1, wherein the evaluator provides data concerning a structural variation and/or a density fluctuation and/or a thickness of at least one page of the at least one document.

16. The system of claim 1, wherein the evaluator provides data concerning a thickness of a distance between two pages of the at least one document.

17. The system of claim 1, wherein the system further comprises a holder configured for holding at least two documents.

18. The system of claim 1, wherein a first measurement arrangement of the at least two measurement arrangements provides the measurement data based on Terahertz time-domain spectroscopy and a second measurement arrangement of the at least two measurement arrangements provides the measurement data based on Computed Tomography or based on phase contrast images.

19. The system of claim 1, wherein a first measurement arrangement of the at least two measurement arrangements provides the measurement data based on phase contrast images and a second measurement arrangement of the at least two measurement arrangements provides the measurement data based on dark-field imaging.

20. A method for analyzing at least one document, comprising:
performing at least two measurements using at least two measurement arrangements,
  wherein each of the at least two measurement arrangements comprises at least two components, where one component of the at least two components is a radiation source and another component of the at least two components is a radiation detector,
  wherein the at least two measurement arrangements differ from each other with regard to a realized measurement principle,
providing measurement data based on radiation emitted by the radiation sources and radiation received by the respective radiation detectors, and
providing data concerning the at least one document based on the measurement data.

* * * * *